July 16, 1957 — J. D. LOCONTI — 2,799,167
TEMPERATURE INDICATORS
Filed Feb. 12, 1953
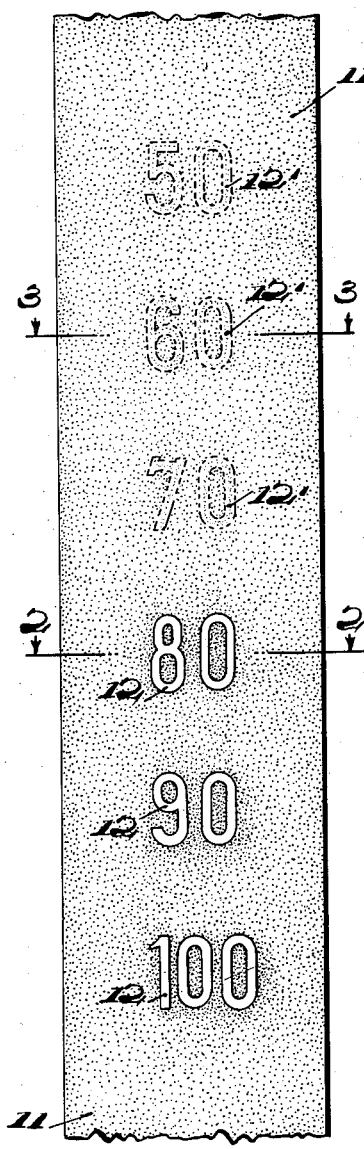
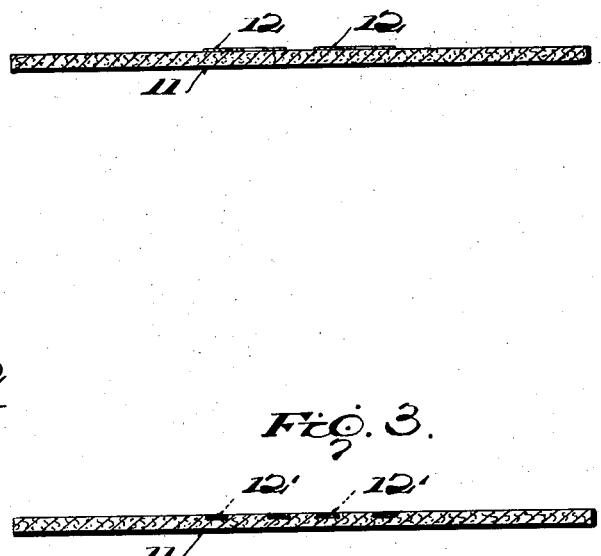
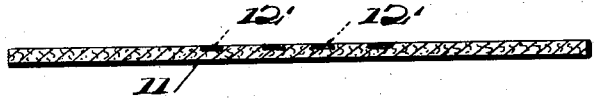
INVENTOR
Joseph D. Loconti
BY W. J. Eccleston, ATTORNEY

United States Patent Office 2,799,167
Patented July 16, 1957

2,799,167
TEMPERATURE INDICATORS

Joseph D. Loconti, Almonesson, N. J., assignor to the United States of America as represented by the Secretary of the Army Application February 12, 1953, Serial No. 336,652

8 Claims. (Cl. 73—356)

(Granted under Title 35, U. S. Code (1952), sec. 266)

The invention described herein, if patented, may be manufactured and used by or for the Government for governmental purposes, without the payment to me of any royalty thereon.

This invention relates to thermal indicators, of the type wherein a coating is applied to a base and irreversibly changes its appearance at a predetermined elevated temperature due to physical changes occurring therein at such temperature.

Devices wherein a coating is applied to a base, and changes its appearance at elevated temperatures by reason of chemical changes, such as oxidation or decomposition, are well known. It has also been proposed to affix a white organic pigment to a dark base by means of a transparent resin and to observe the visual change occurring above the melting point of such pigment. Both methods suffer from lack of precision, in that the oxidative or decomposition reaction is usually gradual, and that the presence of a resin introduces a variable which is inimical to a precise temperature determination.

I have discovered that these and other shortcomings of the prior art may be overcome in either or both of the following manners: A finely divided pigment, preferably organic, e. g. of white color, is intimately admixed with a finely divided dark highly absorptive substance, such as carbon black, and is applied to the base from a solution of a compatible binder in a solvent in which the binder is soluble but the pigment is substantially insoluble; an example of such a binder and solvent are, respectively, a lower alkyl cellulose and water. Or, the same pigment is admixed with the same binder and solvent and is applied therefrom to a highly absorptive base, e. g., highly porous black paper. Both methods may be combined, e. g., by preparing an intimate mixture of finely divided pigment, carbon black and binder, and applying them to a base which may but need not be highly porous; as long as the pigment is in the crystalline state, the coating will appear gray, but will speedily turn black as soon as the pigment is melted and is absorbed in that state by the carbon black.

It is thus an object of my invention to provide a thermally indicating coating composition which accurately, rapidly and irreversibly shows that a certain predetermined temperature has been reached.

Another object of my invention is a series of temperature indicators which may be conveniently applied to a test object, and whose visual appearance at the termination of the test will indicate the temperature limit reached during the test.

A further object of my invention is a temperature indicative composition which would firmly adhere to a porous or non-porous base by means of a binder which will not interfere with the accuracy of the temperature readings.

Yet another object of my invention is a coated paper instantly and irreversibly responsive to a sharp but transitory upward temperature change, as, for instance, in telegraphy or modern high speed reproduction systems, as well as in the high speed recording of electronic computation data.

Still another object of my invention is a thermally indicating composition operating by non-chemical visual changes, which is stable against accidental decomposition and photochemical deterioration.

A still further advantage of a composition of my invention is the ease with which it can be applied to a base by means of a brush, printing roller or other conventional coating implement.

With these and other objects and advantages in mind, I shall now set forth, by way of example, various embodiments of my invention and of the manner in which the same may be practiced. It will be understood, of course, that such examples are by no means exhaustive of the many variations of which the practice of my invention is capable without departing from the spirit thereof.

An example of a "paper thermometer" embodying the principle of my invention is illustrated in the appended drawings, wherein, Figure 1 is an elevational view thereof, Figure 2 is an enlarged cross sectional view taken along line 2—2 of Figure 1; and Figure 3 is an enlarged cross sectional view taken along line 3—3 of Figure 1.

The drawing, of course, is not to scale, particularly in the depth dimension.

More particularly, reference numeral 11 represents a highly absorbent porous backing surface, e. g., thick absorbent black paper. On this backing 11 are arranged deposits 12 of finely divided crystalline compounds (pigments) having a sharply defined melting point and of a color contrasting with said backing, e. g., white, which deposits are applied to said backing in a manner about to be more specifically described. In the illustrated embodiment of my invention, the deposits are arranged successively in the order of their respective melting points, and are configured in the shape of numerals approximately corresponding to their melting points in degrees of the centigrade scale (50, 60, 70, 80, 90, 100). As the temperature to which the thermometric device is exposed rises, the deposits successively melt and are absorbed in the porous backing, which causes them to disappear from sight; thus, when the embodiment shown in Figure 1 reaches the temperature of, say, 75° C., the deposits which are represented by the numerals 12' (which were in the shape of figures 70 and below) have melted and have been absorbed in the fibers of backing 11, while those deposits 12 whose melting point has not yet been reached (those in the shapes of figures 80 and higher) are still in the solid crystalline state and plainly visible. Thus, inspection of the device as shown in Figure 1 shows at a glance that the temperature of 70° C. has been exceeded, and that the temperature of 80° C. has not yet been reached.

It will be understood, of course, that the deposits need not be in the shape of numerals but may be in any desired configuration, e. g., in the shape of circles, triangles, squares, etc., which are coded to correspond to the melting point of the crystalline compound included in the deposit. Where it is desired to limit the test to the observation whether the test object will or will not exceed one given temperature, it will be sufficient if the thermometric device carries only one deposit, namely a deposit including a crystalline substance having a melting point approximately corresponding to such temperature. The visual appearance of the device at the end of the test will show whether or not such temperature has been reached. Similarly, instead of one "paper thermometer" carrying a plurality of deposits, as described, a number of individual papers, each carrying one deposit, may be used.

As heretofore noted, the compounds contemplated in my invention do not become visible again upon reversal of the temperature conditions, i. e., when the temperature is again permitted to drop below the melting point of the respective compounds. Even though the compounds will resolidify, their location nevertheless remains below the surface of the absorbent paper, which prevents their visual re-appearance.

Inasmuch as the pigments of my invention are crystalline, they will not adhere to the backing surface without a binder. I therefore prepare a coating composition for application to the backing by grinding the crystalline substances together with a suitable binder, e. g., polyvinyl alcohol or a lower alkyl or alkoxy alkyl cellulose ether such as for instance, methyl cellulose, and a solvent in which said binder is soluble but said crystalline compound is non-soluble (e. g. water in the case of water-insoluble pigments), until a coatable slurry is obtained, and then apply the coating composition to the backing by means of a brush, printing roller or similar conventional means; other soluble binders are, e. g., pectins, hemicellulose, gelatin, soluble starch. By way of example, such a coating composition may be composed of about 5 to about 50 parts of crystalline pigment, about 1 to about 12 parts of binder (e. g., methyl cellulose or polyvinyl alcohol) and enough water to give 100 parts of composition. The thickness of the coatings preferably range between about .00005" and about .0025"; thicker and thinner coatings may also be employed, but it should be borne in mind that too thick a coating may not satisfactorily absorb into the inner region of the absorbent surface, and that too thin a coating may be too transparent and too likely to rub off to be of much practical use.

As an alternate method, a top coating of a compatible transparent substance may be employed to fix the deposit in place; this top coating may be of the same material as the above-described binders, e. g., polyvinyl alcohol or methyl cellulose. In this alternate method, an aqueous dispersion of the pigment (e. g. 25% solids content) is coated on the backing, and the transparent top coat of binder material is then applied.

The backing, in turn, may be provided with a coating of adhesive on its underside, to facilitate the application of the device to an object whose temperature is to be tested, e. g., in testing a motor block, a strip as shown in Figure 1 is adhesively applied to the motor block, and operation of the engine is started. The observer notes the time when the test is started and the time when the figures imprinted on the test strip successively disappears. A number of such test strips may, of course, be applied to different portions of the motor block (or other objects to be tested). This will furnish a reliable log of the performance of the test object under operating conditions and will particularly reveal conditions of local overheating, which may thereafter be corrected by re-design of the test object.

When it is expected that the temperature conditions encountered will exceed the combustion point of the paper backing, a different backing, e. g., dark colored asbestos, or colored fiberglass should be used instead.

In another form of my invention, I compound a crystalline compound having a sharply defined melting point with a finely divided absorbent substance, e. g., carbon black. In the case of a white pigment, this composition will appear gray. By addition of suitable binder, this composition may be coated directly on the object to be tested. When the melting point of the pigment is exceeded, it liquefies and is absorbed by the carbon black, thereby changing the visual appearance of the coating to black. Instead of carbon black, another finely divided black substance, e. g., black iron oxide, copper oxide, copper sulfide, or lead sulfide may be used or a colored meltable pigment may be compounded with a white powdered substance and binder; after such composition is applied to the test object, and the melting point of the pigment is exceeded, the latter will melt and diffuse into the white carrier. Binders suitable for this modification of my invention are those which are soluble in a liquid in which the crystalline compound is not soluble, e. g., methyl cellulose and water, respectively. Instead of being directly coated on the test object, these compositions may also be coated on the backing of an absorbent or non-absorbent surface, e. g., pressure-sensitive cellulose adhesive tape, which may then be subdivided into desired lengths and applied to the test object. Other suitable carriers would be metal, glass, etc.

I have worked out a catalog of white crystalline water-insoluble pigments having sharply defined melting points within the limits of 45 to 304° C., and therefore suitable for the purposes of my invention; this list is reproduced below in Table I:

*Table I*

| Pigment | Melting Point, °C. | Transition Temperature, °C.[1] |
|---|---|---|
| triortho-cresyl thiophosphate | 45–46 | 45 |
| triphenyl phosphate | 49–50 | 47 |
| di-(n-tetradecyl sebacate) | 50 | 48 |
| palmitic acid | 57–59 | 55 |
| n-octadecyl alcohol | 56–57 | 56 |
| tripalmitin | 63.5–65 | 61 |
| benzhydrol | 67–68 | 61 |
| 4,4'-dibromodiphenyl ether | 58.5–59.5 | 62 |
| di-n-butylthiourea | 66–67 | 62 |
| stearic acid | 69–70 | 68 |
| d-di-n-butylurea | 71.5–73 | 68 |
| dicetyl | 69–70 | 69 |
| 4-chlorobenzophenone | 66–70 | 74 |
| tri-p-cresyl phosphate | 75.5–77 | 74 |
| p-ethoxydiphenyl | 71–72 | 74 |
| acetoacetanilide | 84–85 | 75 |
| sucrose octa-acetate | 85 | 79 |
| n-butyl oxamate | 86–87 | 83 |
| m-diphenylbenzene | 85–86 | 84 |
| benzotriazole | 94–94.5 | 86 |
| tribenzylamine | 91–92 | 92 |
| triphenylmethane | 91.5–93 | 92 |
| hydroxyhydroquinone triacetate | 93–94 | 94 |
| pimelic acid | 103–105 | 94 |
| 2-mercaptothiazoline | 105–106 | 100 |
| 2,4,6-trinitro-1,3-dimethyl-5-tert. butylbenzene | 112–113.5 | 102 |
| m-toluic acid | 109–112 | 103 |
| 2,4-dibromo-naphthol | 108–109 | 105 |
| dichlorodiphenyltrichloroethane | 110.6 | 107 |
| o-benzoylbenzoic acid | 127–128.5 | 110 |
| diacetyl hydroquinone | 119 | 118 |
| benzoic acid | 121.7 | 118 |
| phenyl-p-tolyl sulfone | 127–128 | 121 |
| diphenyl sulfone | 128–129 | 121 |
| sebacic acid | 130–132 | 122 |
| m-nitrobenzoic acid | 140–141.5 | 122 |
| hydroquinone dibenzyl ether | 126–127 | 125 |
| o-dianisidine | 136–138 | 132 |
| o-chlorobenzoic acid | 138–140 | 133 |
| 4-phenylthiosemicarbazide | 139–140 | 134 |
| adipic acid | 153–154 | 146 |
| benzenesulfonylamide | 150.5–152 | 147 |
| phenylthiourea | 150.5–151 | 148 |
| m-chlorobenzoic acid | 152.5–153 | 150 |
| sulfanilamide | 163–164 | 156 |
| benzalacetophenone dibromide | 156–157 | 157 |
| triphenylcarbinol | 161–162 | 160 |
| pyrogallol triacetate | 163–164 | 161 |
| benzanilide | 162–163 | 161 |
| diphenylpiperazine | 165–166 | 164 |
| hydroquinone | 171–173 | 164 |
| thiourea | 173–175 | 167 |
| m-aminobenzoic acid | 172–173 | 169 |
| diamyl hydroquinone | 179–181 | 170 |
| b-methylanthraquinone | 172–174 | 172 |
| s-di-o-tolylthiourea | 186 | 175 |
| anisic acid | 181–184 | 177 |
| d-camphoric acid | 186–187 | 178 |
| succinic acid | 183–184 | 180 |
| p-aminobenzoic acid | 186–187 | 182 |
| hippuric acid | 187–189 | 184 |
| p-hydroxybenzoic acid | 214–216 | 200 |
| dicyandiamide | 209–210 | 205 |
| 2,5-di-tert. butyl hydroquinone | 213–216 | 209 |
| p-diphenylbenzene | 212–213 | 209 |
| saccharine | 224–228 | 220 |
| 4,8-dimethyl-2-hydroxyquinoline | 223–224 | 217 |
| carbanilide | 241–242 | 240 |
| phenolphthalein | 260–261 | 257 |
| theobromine | [2] 330 | 304 |

[1] Temperature at which the indicator just turns black when placed for 10 seconds between two heated aluminum blocks.
[2] In sealed tube.

It will be noted from the last column of the above table that the "transition temperature," i. e., the temperature at which the visual appearance of the thermal indicator actually changes, is in most instances 1 or 2° C. below the melting point. While several theoretical explanations for this phenomenon are available, I do not wish to be bound by any of them, but merely state that this phenomenon is as readily observable as the transition of the compound from its solid to its liquid state, and can be predetermined for each given compound. I therefore use the terms "melting point" and "transition temperature" interchangeably in the specification and claims.

An example of a colored pigment capable of the same use is dimethylamino azobenzene, melting point 116–117° C., transition temperature 114° C. A mixture of 15 parts of dimethyl amino azobenzene, 45 parts of titanium dioxide, 2.5 parts of 15 C. P. methyl cellulose and 175 parts of water appears yellow at room temperatures; above 114° C. the pigment diffuses and thereby turns the color of the composition to orange.

Other specific examples of temperature-indicating coating compositions in accordance with my invention are:

(A.) 25 parts of stearic acid, 1.25 parts of water soluble methyl cellulose and 74 parts of water are milled in a conventional pebble mill for 24 hours. The resulting white dispersion is sprayed on a porous black surface in a thin even coat. Transition temperature: 68° C.

(B.) White non-absorbing paper is coated with a mixture of 10% Carbon Black G and 1% 400 C. P. Methocel in water. This base coating is then overcoated with a coating composition of a white crystalline pigment and methyl cellulose. With triphenyl phosphate as the pigment, transition temperature was observed to be 47° C., with stearic acid 68° C., hydroquinone dibenzyl ether 127° C., benzanilide 161° C., dicyandiamide 204° C.

(C.) A mixture of 20 parts triphenyl phosphate, 1.8 parts carbon black (Micronex, Columbian Carbon Company, New York), 2 parts 15 C. P. Methocel methyl cellulose, and 76.2 parts water is coated or printed on a metallic surface. At room temperature, the coating appears gray; upon exceeding the transition temperature of 47° C., the space occupied by the coating appears black.

(D.) 25 parts of di-n-butyl thiourea are ground to a slurry with .6 part of Mapico Black (black iron oxide manufactured by Columbian Carbon Company), 1.25 parts of 15 C. P. methyl cellulose and 73.15 parts of water. The composition, which has a gray color is sprayed on a non-absorbent white backing; at 61° C. it turns black.

In yet another variation of my invention, I have found that a monomeric polymerizable crystalline compound whose melting point substantially coincides with the temperature at which polymerization takes place, can be used in a temperature indicator. If such a compound is once permitted to melt and polymerize upon exposure to the critical elevated temperature, subsequent lowering of the temperature below the melting point of the compound will nevertheless not result in depolymerization. Consequently, it will not be necessary to employ a highly absorbent backing with a pigment of this type inasmuch as the irreversible change in visual appearance is independent of any absorption in the surface of the backing. An example of such a pigment is sucrose-octa-acetate which melts and polymerizes at 85° and has a transition temperature of 79° C. I prefer to compound sucrose octa-acetate with Micronex carbon black and a suitable binder, e. g., methyl cellulose, and to apply this composition to a backing which need not be absorbent; for example, 25 parts of sucrose octa-acetate, .5 part of carbon black, 1.25 parts of 15 C. P. methyl cellulose, and 73.25 parts of water given a suitable coating composition, gray in appearance at room temperature, and irreversibly turning black at 79° C.

It will thus be seen that I have provided simple and inexpensive temperature indicators in the form of "paper thermometers," or thermally indicative direct coatings, which are capable of a large variety of uses and applications. Having described a considerable number of variations and specific examples of my invention, I wish to be understood that they are illustrative in nature and may be departed from, while still remaining within the spirit and scope of my invention. I therefore refer to the appended claims which define the scope of my aforesaid invention.

I claim:

1. A paper thermometer comprising a highly absorbent black paper, and sequentially arranged thereon deposits of finely divided white substantially water-insoluble crystalline organic pigments having sharply defined melting points, each of said pigments being intimately admixed with a water-soluble solid binder, compatible with said pigment and said deposits being arranged in the order of their respective melting points; whereby when an upward change in thermal conditions within the range of the melting points of said pigments occurs, said pigments melt in the order of their respective melting points and are successively absorbed by said black paper, which results in a readily observable irreversible change of the appearance of that area of said paper thermometer which carries compounds having a melting point lower than the highest temperature reached in the course of said change in thermal conditions.

2. A thermal indicator comprising a base, and sequentially arranged thereon a plurality of deposits of an intimate mixture of carbon black and of a finely divided white crystalline compound having a sharply defined melting point, said crystalline compounds being different in each of said deposits, and said deposits being arranged in the order of the respective melting points of said crystalline compounds; whereby when an upward change in thermal conditions within the range of the melting points of said compounds occurs, said compounds melt in the order of their respective melting points and are absorbed by said carbon black, resulting in an irreversible color change of these deposits which contain compounds having a melting point lower than the highest temperature reached in the course of said change in thermal conditions.

3. A thermometer comprising highly absorbent porous material carrying a thin deposit of a contrasting color essentially comprising a finely divided water-insoluble organic pigment having a sharply defined melting point, and a water-soluble solid binder compatible with said pigment; whereby when said thermometer is exposed to an upward change in thermal conditions, said pigment melts and is fully absorbed into the interior of said material so as to remain out of sight even after recrystallization, which results in an irreversible change of the visual appearance of that portion of said material to which said deposit has been applied.

4. A thermometer according to claim 3, wherein said binder is a water-soluble alkyl cellulose.

5. A thermometer according to claim 3, wherein said binder is water-soluble methyl cellulose.

6. A thermometer according to claim 3, wherein said binder forms a protective coating on said pigment.

7. A thermometer according to claim 3, wherein said porous material is black paper, and said organic pigment is white in the crystalline state.

8. A paper thermometer according to claim 7, wherein said binder is water-soluble methyl cellulose.

References Cited in the file of this patent

UNITED STATES PATENTS

| | | |
|---|---|---|
| 1,535,536 | MacDonald | Apr. 28, 1925 |
| 1,668,767 | Hanson | May 8, 1928 |
| 1,844,199 | Bicknell | Feb. 9, 1932 |
| 1,924,793 | Laske | Aug. 29, 1933 |
| 2,261,473 | Jennings | Nov. 4, 1941 |
| 2,269,038 | Perry | Jan. 6, 1942 |
| 2,313,810 | Dalton | Mar. 16, 1943 |
| 2,379,459 | Schreiber et al. | July 3, 1945 |
| 2,386,319 | Johnson | Oct. 9, 1945 |
| 2,638,422 | Cooley et al. | May 12, 1953 |
| 2,666,583 | Whitney | Jan. 19, 1954 |

OTHER REFERENCES

Murray: Abstract of application 790,115, published Nov. 13, 1951, 652 O. G. 617.